US012335557B1

(12) United States Patent
Krueger et al.

(10) Patent No.: US 12,335,557 B1
(45) Date of Patent: Jun. 17, 2025

(54) ASPECT ADJUST RATIO DISPLAY SYSTEM FOR MOBILE COMPUTING DEVICES

(71) Applicant: Fancaster, Inc., Fort Lee, NJ (US)

(72) Inventors: Craig Krueger, Fort Lee, NJ (US); James Berry, Hoboken, NJ (US)

(73) Assignee: Fancaster, Inc, Fort Lee, NJ (US)

( * ) Notice: Subject to any disclaimer, the term of this patent is extended or adjusted under 35 U.S.C. 154(b) by 0 days.

(21) Appl. No.: 17/977,750

(22) Filed: Oct. 31, 2022

Related U.S. Application Data (62) Division of application No. 17/012,801, filed on Sep. 4, 2020, now abandoned.

(60) Provisional application No. 62/896,969, filed on Sep. 6, 2019.

(51) Int. Cl.
*H04N 21/4223* (2011.01)
*H04N 7/14* (2006.01)
*H04N 21/414* (2011.01)
*H04N 21/422* (2011.01)

(52) U.S. Cl.
CPC ......... *H04N 21/4223* (2013.01); *H04N 7/142* (2013.01); *H04N 7/147* (2013.01); *H04N 21/41407* (2013.01); *H04N 21/42203* (2013.01)

(58) Field of Classification Search
CPC .. H04N 7/142; H04N 7/147; H04N 21/41407; H04N 21/42203; H04N 21/4223
USPC .............................................. 348/14.02–14.9
See application file for complete search history.

(56) References Cited

U.S. PATENT DOCUMENTS

| | | | |
|---|---|---|---|
| 10,037,780 B1* | 7/2018 | Roberts | H04N 21/2743 |
| 10,182,250 B2 | 6/2019 | Krueger et al. | |
| 10,645,294 B1* | 5/2020 | Manzari | H04N 23/74 |
| 11,146,646 B2* | 10/2021 | Taine | H04L 67/535 |
| 2006/0139463 A1* | 6/2006 | Heinonen | H04N 7/142 |
| | | | 348/E5.025 |
| 2007/0279482 A1* | 12/2007 | Oswald | H04N 7/142 |
| | | | 348/14.02 |
| 2007/0296866 A1* | 12/2007 | Fujisawa | H04N 7/0122 |
| | | | 348/E5.062 |
| 2010/0333004 A1* | 12/2010 | Kristiansen | H04N 7/142 |
| | | | 715/765 |
| 2014/0267546 A1* | 9/2014 | Kwon | H04N 7/147 |
| | | | 348/14.02 |
| 2018/0176508 A1* | 6/2018 | Pell | H04L 65/1089 |
| 2021/0289292 A1* | 9/2021 | Eronen | G11B 27/10 |
| 2021/0366359 A1* | 11/2021 | Hong | G09G 3/32 |
| 2022/0132095 A1* | 4/2022 | Leung | G06T 7/55 |

* cited by examiner

*Primary Examiner* — Maria El-Zoobi
(74) *Attorney, Agent, or Firm* — Blank Rome LLP (57) ABSTRACT

A system provides automatic aspect ratio adjustment, multi audio channel processing, and/or a reconfigurable display, each of which can be implemented by itself or together in mobile computing devices which receive synchronized video broadcasts from two or more cameras.

14 Claims, 6 Drawing Sheets

ASPECT ADJUST RATIO DISPLAY SYSTEM FOR MOBILE COMPUTING DEVICES

CROSS-REFERENCE TO RELATED APPLICATIONS

This application is a divisional application of U.S. patent application Ser. No. 17/012,801, filed on Sep. 4, 2020, which claims the benefit of priority of U.S. Application Ser. No. 62/896,969 filed on Sep. 6, 2019. The contents of these applications are incorporated herein by reference in their entirety.

BACKGROUND

U.S. Pat. No. 10,182,250 provides a multimedia broadcast content platform. Among other things, the platform synchronizes first and second audio/video content information and generates combined content at a user device. The content is captured by forward-facing and rearward-facing cameras, respectively.

SUMMARY

The disclosure relates generally to automatic aspect ratio adjustment, multi audio channel processing, and/or a reconfigurable display, each of which can be implemented by itself or together in mobile computing devices which receive synchronized video broadcasts from two or more cameras

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

A system is provided for automatic aspect ratio adjustment, multi audio channel processing, and/or a reconfigurable display, each of which can be implemented by itself or together in mobile computing devices which receive synchronized video broadcasts from two or more cameras.

Automatic Aspect Ratio Adjustment

The present disclosure describes a system where aspect ratios within displays in mobile devices automatically adjust to make subjects maintain proportionality in the framing of multiple video feeds when two or more video streams from multiple cameras in a single mobile computing device are synchronous into one single display.

For example, a consumer at an event such as a parade might use a mobile device enabled to record and send video and audio to broadcast themselves reporting play-by-play commentary with both the event and individual in a single synchronous display. With multiple camera feeds in a split screen situation, mobile devices must be capable of adjusting images, particularly from cameras illuminating people and objects so both are not larger than the actual reduced display space. The resulting automatic aspect ratio is adjusted in proportionality to the display size assigned to each video feed from each camera being employed by the operator of the device so the combined image will realistically align with the actual shapes and sizes of people and/or objects as seen on the display of mobile computing devices, television monitors, computer monitors, wireless entertainment devices, or other video displays.

Thus, the system will automatically default to an aspect ratio for the first camera (e.g., facing the user) that aligns with an aspect ratio of the second camera (e.g., facing away from the user and toward a target). The user can adjust the aspect ratio, if desired.

Commercially available devices exist with multiple cameras, but they do not contain automatic aspect ratio adjust to proportionately and seamlessly and intelligently re-size and/or crop all of the videos/images in context with available screen space in the respective display of each broadcaster.

As used here, the term "Aspect Ratio" refers to the ratio of the width to the height of an image or display. The system employs software, and computer code, to automatically adjust aspect ratios when multiple video streams from multiple cameras in mobile computing devices are synchronously combined into one display.

In one embodiment, a consumer's broadcast of an event, such as a parade, is synchronously displayed in a side-by-side 50-50 split screen within the display of a mobile computing device. The aspect ratio of both the consumer's front facing camera and back facing camera are automatically adjusted so both videos/images are in proportion to the reduced space within the display of the mobile computing device. To do this, the software intelligently evaluates each camera feed in real time. In this example we will assume we are using a front facing camera and a back-facing camera, although the placement of the cameras on a device may vary. The front facing camera, in most cases, will capture the image of the consumer. The system determines the location of the consumer in the picture and resizes the video to the proper size and will crop the video on the left and right as needed for the consumer to be centered in the video at the correct size and aspect ratio to fill 50% of the combined video stream. The back facing camera also goes through the same process. Any camera without identifiable focal points will resize accordingly and will crop to center to fit 50% of the combined video stream. These calculations will be applied as needed depending on the device, and the rotation of the device (if applicable).

In another embodiment a consumer's broadcast of a sporting event may be synchronously displayed in a picture-in-picture format where the event may take up 75 percent of the screen within the display and the consumer's front facing camera with their play-by-play of the broadcast of a sporting event may take up the remaining 25 percent of the screen within the display of a mobile device. In this embodiment, the automatic aspect ratio adjust will proportionately reframe both event and consumer in proportion to the display. In this case the two camera inputs will remain at the same aspect ratio as the original input. One stream will be full screen in the background, while the second stream will be layered on top and resized to fit roughly 25% of the screen. When resized the aspect ratio will remain the same.

In another embodiment, there could be three or more video feeds synchronously displayed in a mobile computing device where there may be a consumer using the front-facing camera, another consumer being displayed in the back facing camera, and a third object such as a rainbow over a mountain top. In this embodiment, all three videos/images will have aspect ratios automatically adjusted in proportion to the space allocated per video/image for the screen on a computing device's display. In this case, there will be multiple feeds that will be displayed either by predetermined templates or user configured templates. In both cases, all feeds will be evaluated in real time by the software and resized and cropped to center (when there is a clear focal point) and displayed in the predetermined area of the display. All synchronous feeds will be combined in a single video file for viewing.

Figure 1:
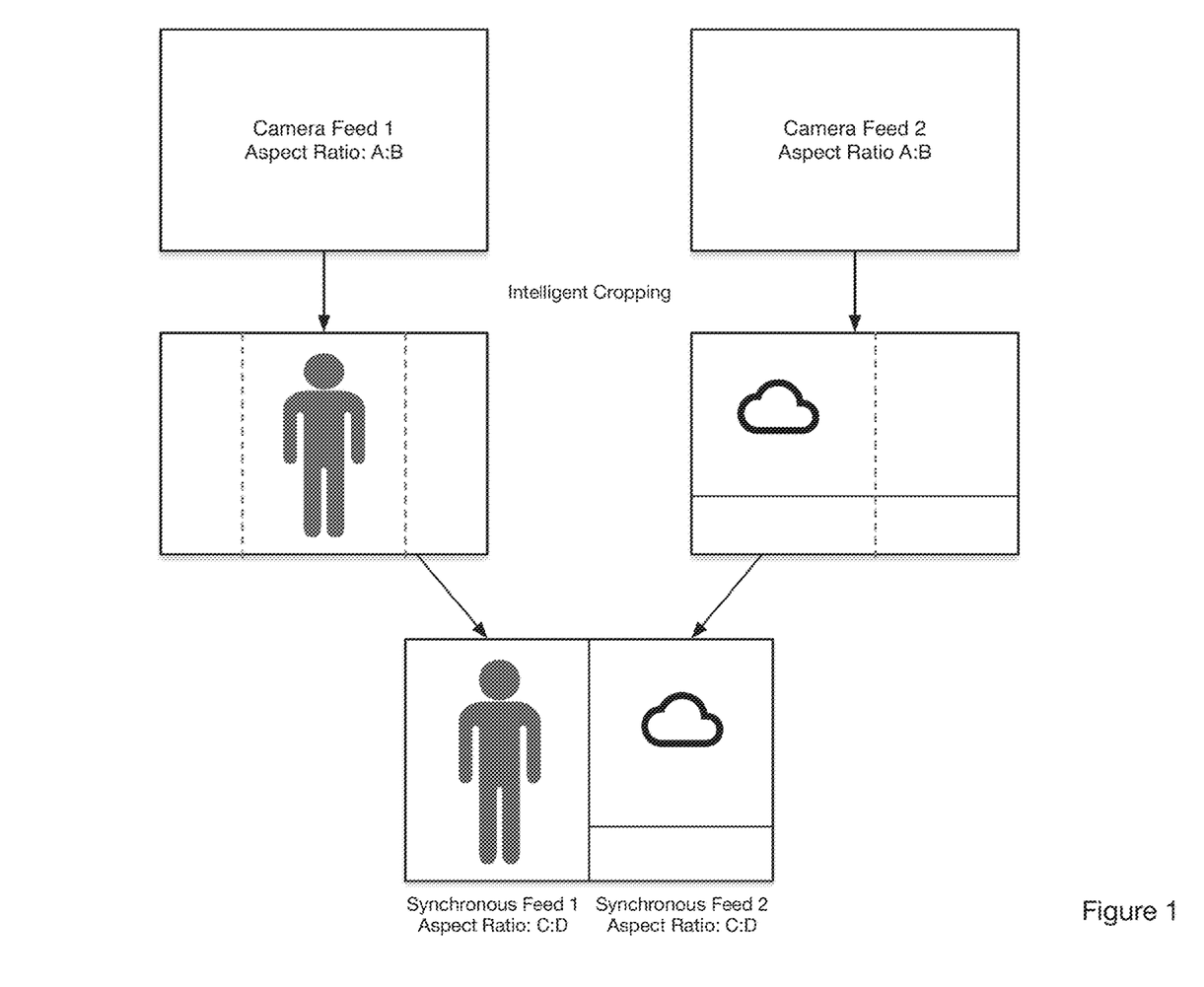
FIG. 1 is a block diagram of two synchronous feeds.

FIG. 1 shows a system having two synchronous feeds (one from camera 1, facing the user; and one from camera 2, facing away from the user). The system processes the feeds individually and synchronously in real time to determine the focal point and then combined into a single stream with new aspect ratios that allow them to fit the display of the device.

Figure 2:
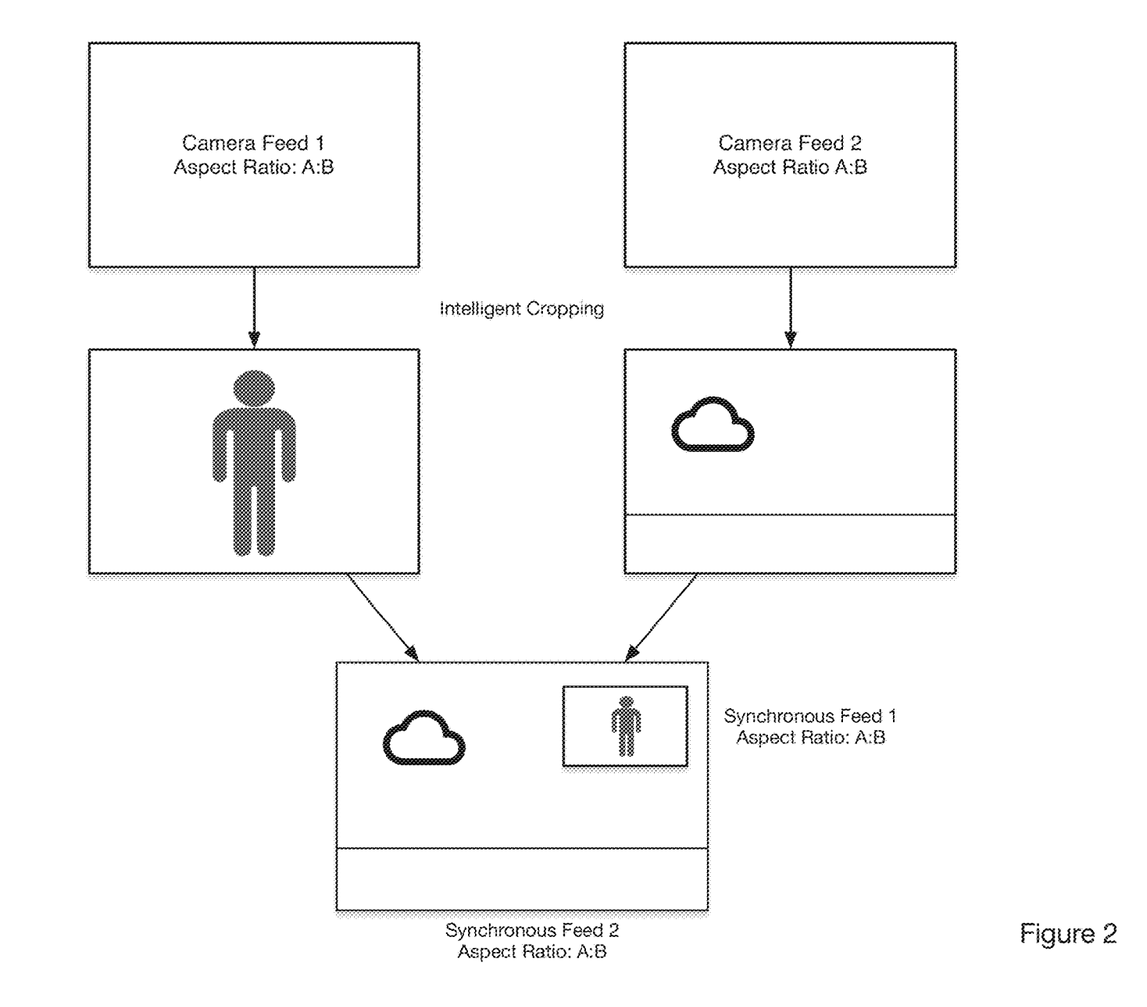
FIG. 2 is shows individual processing of the two synchronous feeds.

FIG. 2 shows how two synchronous feeds are individually processed by the system to determine the focal point, which in this case it is determined that the aspect ratio does not need to change, resulting in a resizing of the video but no change to the aspect ratios.

Figure 3:
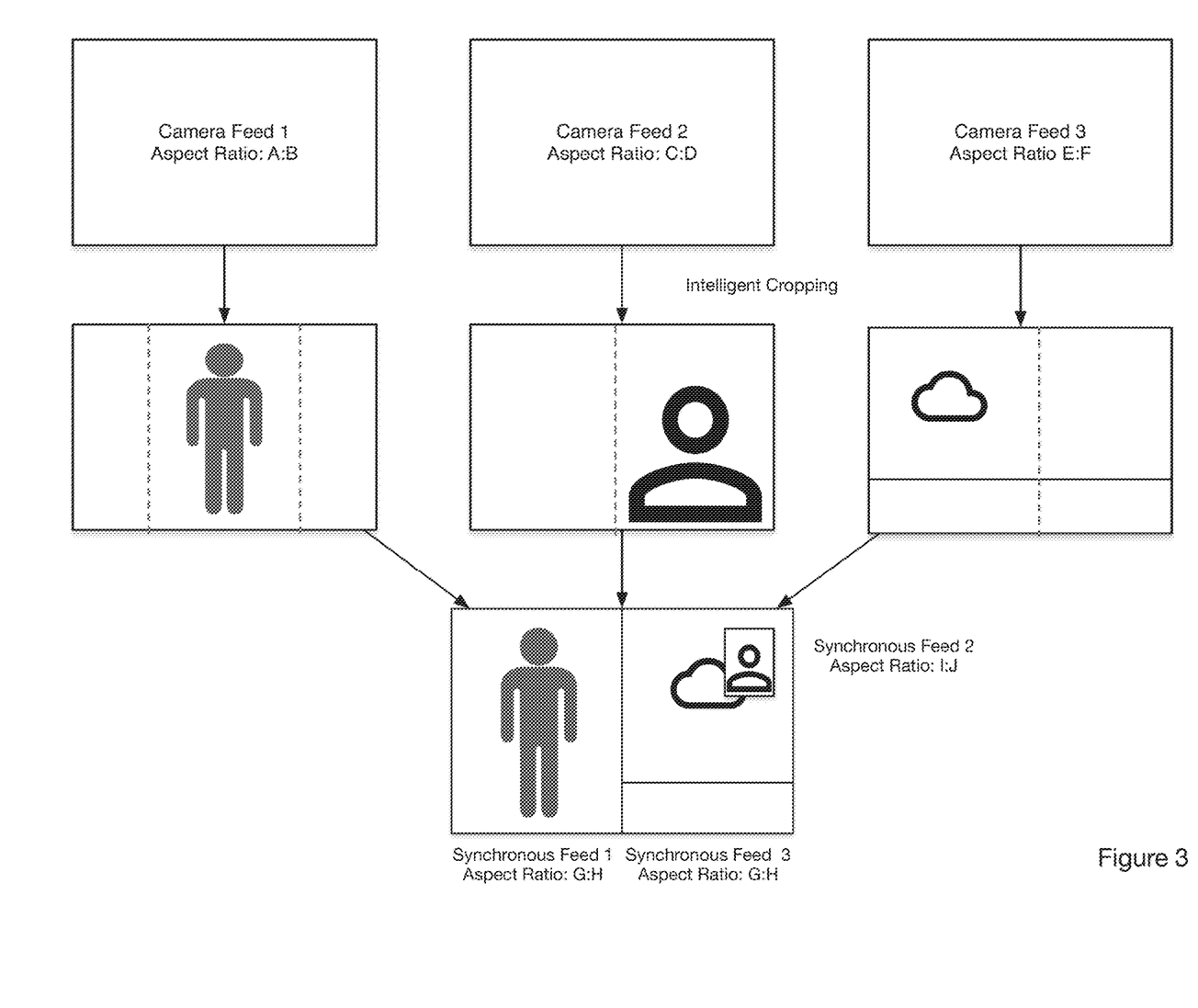
FIG. 3 shows three synchronous feeds being individually processed.

FIG. 3 shows how three synchronous feeds are individually processed by the system to determine the focal point and then combined into a single stream with new aspect ratios that allow them to fit the display of the device.

This disclosure provides a platform for the creation and broadcasting of synchronous content with mobile computing devices when two or more video streams from cameras within mobile devices are employed in the creation of broadcast videos. More specifically, this disclosure provides for automatic aspect ratio adjust, flexible viewing and sizing of multiple synchronous broadcast streams and synchronous audio where a second audio channel is created to facilitate clear audio from consumers who broadcast with mobile computing devices.

Synchronized Multi-Channel Audio System

The present disclosure provides a system where consumers can synchronously capture and record audio in two separate channels by employment of an external microphone either tethered of connected wirelessly to a mobile computing device. The two audio channels each capture audio where the built-in microphone within mobile computing devices will capture an event with back-facing camera while the external microphone will capture the consumer broadcasting, speaking, singing, screaming, or any other sounds and synchronously combine both channels together and then synchronize with the pertinent respective video from both front and back-facing cameras in mobile computing devices.

In other words, audio from the built-in microphone of mobile computing device is synchronized with separate audio channel configured from an external microphone with both audio feeds synchronously combined to match with events from both front and back facing cameras and concurrently synchronized with video feeds from both front-facing and back-facing cameras within mobile computing devices all integrated into one single video feed.

For example, a consumer at an event such as a parade might use a wireless device enabled to record and send video and audio to broadcast themselves reporting play-by-play commentary with Synchronized Multi-Channel Audio System both the audio from event and individual consumer's broadcast will be synchronized in a single synchronous audio feed emanating from two separate channels.

With two separate audio channels within the present disclosure, a consumer's broadcast will be clearer and crisper than employment of microphone embedded within mobile computing devices.

The second audio channel has sound capture via an external microphone then configured to synch with audio from built-in microphone in mobile computing devices. The combined audio is then synchronized with synchronized video from both front and back cameras on mobile computing devices or alternatively the combined audio may be Synchronized with more than two video feeds if more than two cameras are synchronously employed on mobile computing devices.

As used here, an "external microphone" is a separate attachment or wireless device that connects to a mobile computing device to pick up sounds more clearly and accurately. It may plug into a jack within a mobile computing device or be connected remotely via Bluetooth or wifi.

The system employs software, and computer code, to facilitate consumer to record audio on an external microphone that is a separate audio channel from the channel receiving audio from built-in microphones. The combined synchronized audio is synchronized with video from both front and back cameras in mobile computing devices or alternatively the combined audio may be synchronized with more than two video feeds if more than two cameras are synchronously employed on mobile computing devices.

In another illustrative example non-limiting embodiment, a consumer's broadcast of a sporting event may be synchronously broadcast with two separate audio channels by employment of an external microphone and synchronously combined with audio from built-in microphone within mobile computing devices. The synchronized audio from both channels is synchronously and seamlessly integrated with synchronized video from both front and back cameras in mobile computing devices.

In another example embodiment, there could be three or more audio channels synchronously integrated in a mobile computing device where there may be a consumer using an external microphone with front-facing camera, another consumer using an external microphone in the back facing camera, and a third audio feed capture from the mobile computing device's built-in microphone (with audio from an event). In this embodiment, all three audio channels will synchronously combine with all corresponding video images in one stream where stream (a) The front-facing camera shows the consumer, (b) the back-facing camera shows another consumer and (c) and built in microphone combine and all three synchronously integrate with corresponding videos into one integrated synchronous video with separate audio for all three cameras. It is important to note that multiple cameras may be within each mobile computing device, attached, tethered or wirelessly connected. The system may deliver separate audio for each separate camera and synchronously combine with each respective video stream.

The present disclosure provides a simple solution for the creation of separate audio channels on mobile computing devices that are synchronously integrated with multiple broadcast streams from two or more cameras within, or connected to, a device directly or through a wireless connection. This system enables consumers the ability to have better and crisper audio when broadcasting events by employment of an external microphone on a mobile computing device and synchronized with all corresponding video streams from each camera being utilized by each mobile computing device.

Synchronous Broadcasting Reconfigurable Display System

The present system can also include a user reconfigurable display, i.e., a system where consumers can configure video feed sizes and aspect ratios when video broadcasts are synchronized with broadcast feeds from dual or multiple cameras in any proportion and location within the display screen of mobile computing devices to facilitate flexible display of image sizes and locations within displays when multiple video feeds from two or more cameras are synchronously integrated into one single video feed.

For example, a consumer at an event such as a parade might use a wireless device enabled to record and send video and audio to broadcast themselves reporting play-by-play commentary with both the event and individuals in a single synchronous display. With the flexible or reconfigurable display system of the present system, a consumer can adjust or set screen size and location of images from each video feed into a single display screen so the event, parade in this case may comprise 75% of the screen and the consumer the remaining 25% if there are only two cameras feeding into the synchronized broadcast video in a split screen situation.

Consumers can set their own location and size of images from each respective camera which are synchronized into one video feed.

The resulting synchronized video broadcasts are flexibly positioned pursuant to the location and sizing the consumer directs to in the end to collectively comprise 100% of the screen size of each mobile computing device being employed so the combined image will realistically align with the dimensions and locations within the display of people and/or objects as determined by the user through this system.

The display of mobile computing devices, television monitors, computer monitors, wireless entertainment devices, or other video displays will include at least two or more video streams each emanating from a separate camera located within or attached to each device.

Commercially available devices exist with multiple cameras, but they do not contain the flexibility to allow consumers to adjust locations and sizes of each image when broadcasting in a synchronous environment with at least two or more video streams emanating from separate cameras within or attached to each mobile computing device.

The system employs software, and computer code, to facilitate consumer control of viewing multiple video feeds that are synchronized into one video stream automatically adjusting video feed size to accommodate settings the user inputs for each video stream emanating from a separate or attached cameras in mobile computing devices that are synchronously combined into one display.

In one example non-limiting illustrative embodiment, a consumer's broadcast of an event, such as a parade, is synchronously displayed in a side-by-side display 50-50 split screen as both location and screen size per feed are determined by the user within the display of a mobile computing device and both consumer's image and event are automatically adjusted so both images are seen in a side-by-side position with proportionately reduced space within the screen of the display of mobile computing device.

In another embodiment, a consumer's broadcast of a sporting event may be synchronously displayed in a picture-in-picture format where the event may take up 75 percent of the screen within a display and the consumer's broadcast of sporting event may take up the remaining 25 percent of the screen within a display of a mobile device. In this embodiment, the flexible display will depict the size and location determined by the user and reframe both event and consumer in proportion to the modified images in the display.

In another embodiment, there could be three or more video feeds synchronously displayed in a mobile computing device where there may be a consumer using the front-facing camera, another consumer being displayed in the back facing camera, and a third object such as a rainbow over a mountain top. In this embodiment, all three images will have the flexibility to view all three synchronous videos in one stream where stream (a) The front-facing camera shows the consumer, (b) the back-facing camera shows another consumer and (c) an attached camera illuminates the rainbow and the size of each stream and location of each video stream is flexibly set by the user and when combined, all three synchronous videos are displayed to when combined, comprise 100 percent of the display in a mobile computing device.

Figure 4:
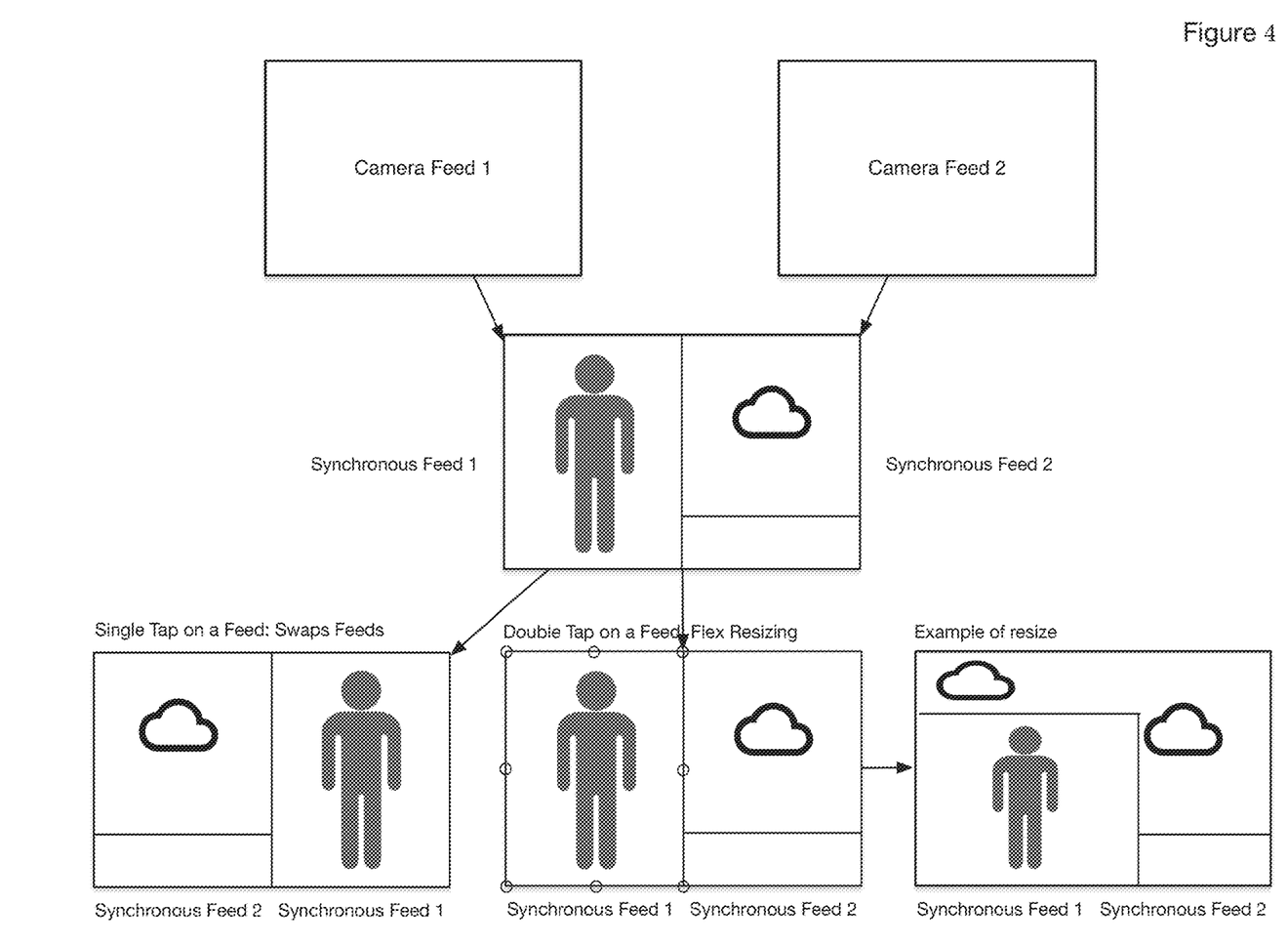
FIG. 4 shows user commands.

FIG. 4 shows how the user can issue a command, such as a single tap on the touchscreen, to switch the feeds between the display views. With a double tap on either feed, that feed shows multiple drag points for the user to resize that feed. The video will scale vertically and horizontally using keeping its aspect ratio.

Figure 5:
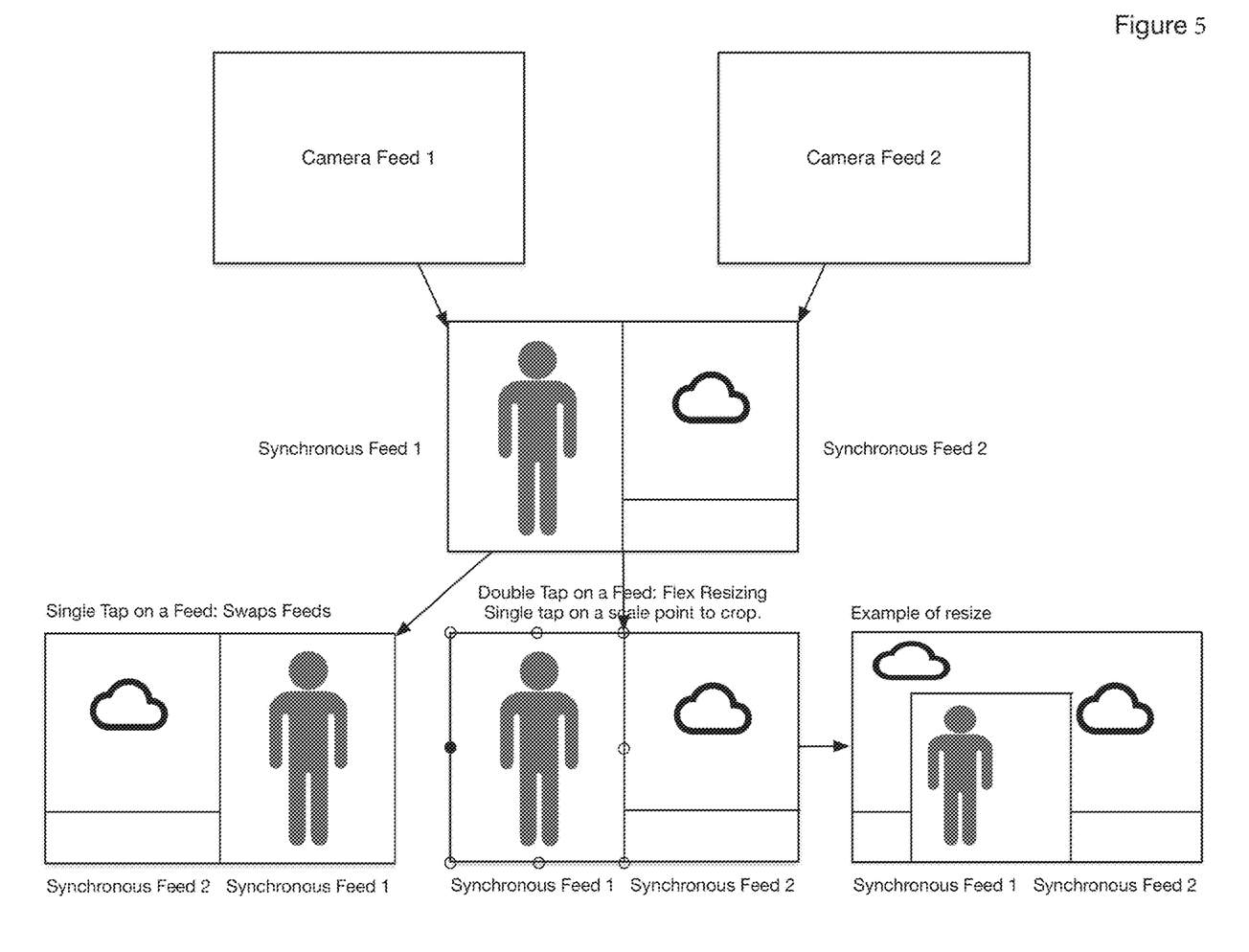
FIG. 5 shows switching fees.

FIG. 5 shows how the user can single tap to switch the feeds between the display views. With a double tap on either feed that feed shows multiple drag points for the user to resize that feed. If the user taps one of the scale points rather than dragging it will highlight and as the user resizes the video will crop vertically or horizontally depending on the point tapped. They may also press and hold and drag a feed around the display to create a new placement.

Figure 6:
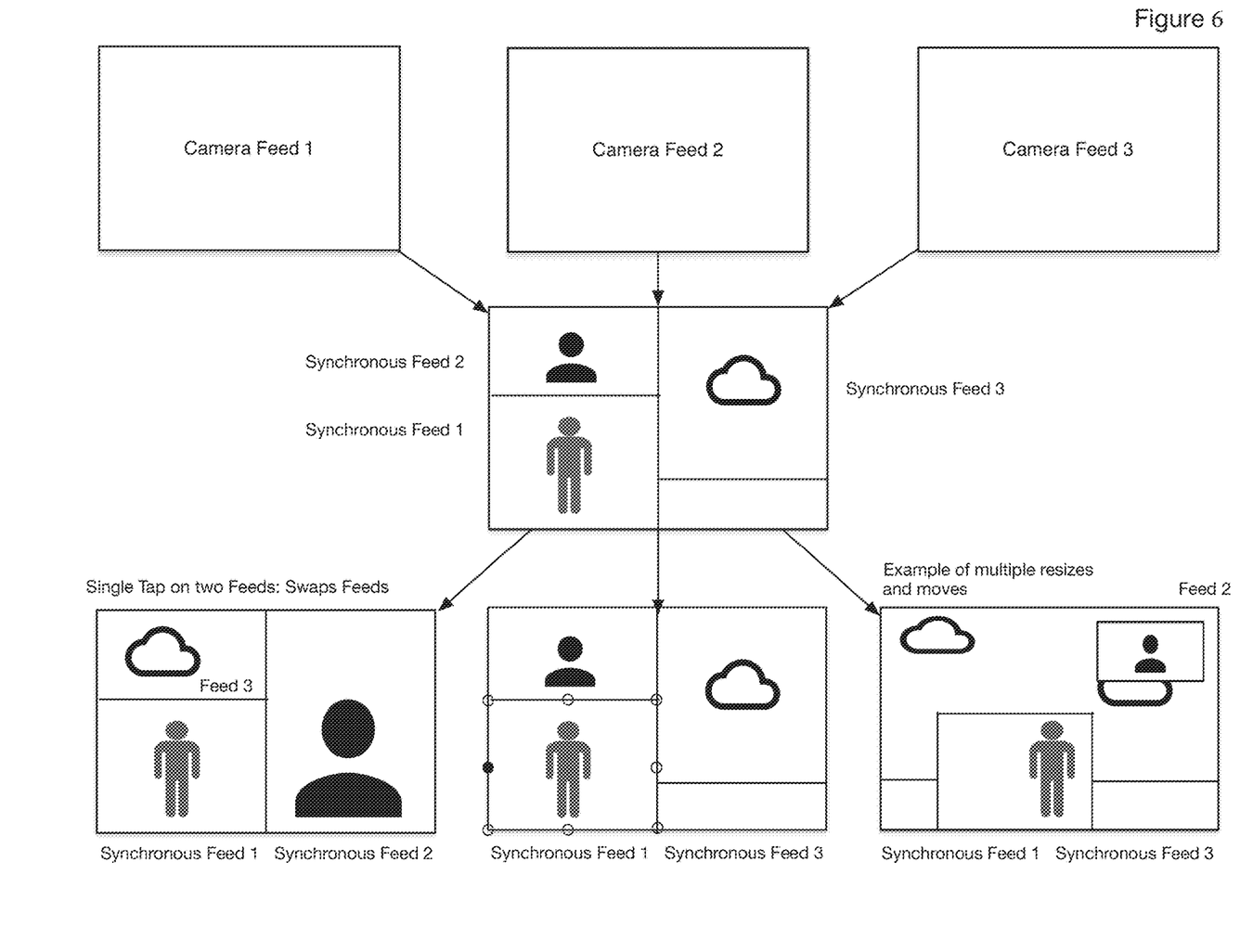
FIG. 6 shows switching display feeds.

FIG. 6 shows how the user can single tap one feed then single tap another to switch the feeds between those display views. With a double tap on any feed that feed shows multiple drag points for the user to resize that feed keeping the aspect ratio. The user may also double tap a point to crop the feed and press and hold and drag a feed around the display for new placement.

Thus, the present system provides a simple, solution for flexible display of broadcast streams that are synchronously broadcast on mobile computing devices. This system enables consumers the ability to set the specific location and size of each video stream as it will appear on the display of each mobile computing device along with flexible sizing for each separate video stream to be displayed as all video streams are synchronized.

Additional Features

It is noted that the various features (namely the aspect ratio adjustment, synchronized multi-channel audio, and reconfigurable display) each have separate utility and can be used alone in mobile computing devices which receive synchronized video broadcasts from two or more cameras. For example, the aspect ratio adjustment can be provided on a mobile device without synchronized multi-channel audio or a reconfigurable display. However, any two or more of those features can be combined in one system. For example, a mobile phone can provide both aspect ratio adjustment and synchronized multi-channel audio for recording and broadcasting events from two cameras. Or, a mobile phone can provide aspect radio adjustment and a reconfigurable display to present the adjusted images from two cameras.

In addition to the description above, the main additional hardware camera components for the system include: 1) at least two lenses either embedded in the device or attached or connected through a wireless connection (lens is the component in which light goes through); 2) image processor; and 3) a sensor which detects light. In addition, for the audio synchronization, there is: 4) microphone, and 5) headphone jack (optional), which can connect remotely.

All or parts of the system, processes, and/or data utilized in the system can be stored on or read from the storage device(s). The storage device(s) can have stored thereon machine executable instructions for performing the processes of the system. The processing device can execute software that can be stored on the storage device. Unless indicated otherwise, the process is preferably implemented in automatically by the processor substantially in real time without delay.

The processing device can also be connected to the Internet, such as by wireless or wired connection. The processing device can interact with a website or smart phone application to execute the operation of the system, such as to present output (as shown in the Figures), reports and other information to a user via a user display, solicit user feedback via a user input device, and/or receive input from a user via the user input device. For instance, the processing device can be part of a mobile smart phone application (such as a browser or customized application) that communicates with the user and/or third parties via the Internet.

It is further noted, without limitation, that as used herein, a mobile phone, mobile device or mobile computing device can include television monitors, computer monitors, wireless entertainment devices, or other video displays. A "display" can include an LED (light-emitting diode) display (i.e., a screen display technology that uses a panel of LEDs as the light source), or a display can include a liquid crystal display, which is the most common display type among mobile phones. "Synchronous" is "the condition that occurs when two events happen in a specific time relationship with each other and both are under control of a master clock."

The description and drawings of the present disclosure should be considered as illustrative only of the principles of the system. The system may be configured in a variety of ways and is not intended to be limited by the preferred embodiment. Numerous applications of the system will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

In the embodiments of the disclosure, the mobile device can include a processing device to perform various functions and operations in accordance with the disclosure. The processing device can be, for instance, a computer, mobile computing device, or more generally a computing device, processor, application specific integrated circuits (ASIC), or controller. It can also have one or more of a wide variety of components or subsystems including, for example, wired or wireless communication links, input devices (such as touch screen, keyboard, voice activated, mouse) for user control or input, monitors for displaying information to the user, and/or storage such as memory, RAM, ROM, analog or digital memory, flash drive, database, computer-readable media, and/or hard drive/disks.

The invention claimed is:

1. A mobile device comprising:
a plurality of cameras including a first camera on a first side of said mobile device to capture a first video signal, and a second camera on a second side of said mobile device to capture a second video signal;
a processing device configured to receive the captured first and second video signals and adjust in real time an aspect ratio of at least one of the first and second video signals; and
a display device having a first display area having a first display size and a second display area having a second display size, and having a first display configuration to display said first video signal in the first display area and the second video signal in the second display area, and a second display configuration to display the first video signal in the second display area and the second video signal in the first display area, wherein said processing device adjusts the aspect ratio based on the first display size and the second display size.

2. The mobile device of claim 1, said processing device configured to transmit the adjusted first and second video signals or files for broadcast.

3. The mobile device of claim 1, said processing device configured to combine the adjusted first and second video signals and to transmit the combined first and second video signals for broadcast.

4. The mobile device of claim 1, further comprising an input device configured to receive a user command to switch said mobile device between the first display configuration and the second display configuration.

5. The mobile device of claim 4, said input device comprising a touchscreen that detects the user command, and said processing device switching between the first display configuration and the second display configuration in response to said touchscreen detecting the user command.

6. The mobile device of claim 1, said processing device synchronizing the first and second video signals.

7. The mobile device of claim 1, said processing device further configured to adjust the aspect ratio by cropping at least one of the first and second video signals.

8. A mobile device comprising:
a first camera on a first side of said mobile device to capture a first video signal having a first aspect ratio of height to width of the first video signal;
a second camera on a second side of said mobile device to capture a second video signal having a second aspect ratio of height to width of the first video signal and the second aspect ratio is different than the first aspect ratio;
a user-reconfigurable display device having a first display area with a first display size and a second display area with a second display size, and having a first display configuration to display said first video signal in the first display area and the second video signal in the second display area, and a second display configuration to display the first video signal in the second display area and the second video signal in the first display area, wherein said processing device adjusts the aspect ratio based on the first display size and the second display size;
an input device configured to receive a user command; and a processing device configured to receive the captured first and second video signals, change the first or second aspect ratio of at least one of the first and second video signals, respectively, and switch said mobile device between the first display configuration and the second display configuration in response to said input device receiving the user command.

9. The mobile device of claim 8, said processing device further configured to automatically adjust an aspect ratio of at least one of the first and second video signals.

10. The mobile device of claim 8, said input device comprising a touchscreen that detects the user command, and said processing device switching between the first display configuration and the second display configuration in response to said touchscreen detecting the user command.

11. The mobile device of claim 7, said processing device cropping the at least one of the first and second video signals based on available screen space in a respective display.

12. The mobile device of claim 7, said processing device further configured to identify one or more focal points in the at least one of the first and second video signals, and cropping the at least one of the first and second video signals based on the identified one or more focal points.

13. The mobile device of claim 1, wherein said processing device centers a person in the first or second video signals.

14. The mobile device of claim 8, wherein said processing device centers a person in the first or second video signals.

* * * * *